No. 693,095. Patented Feb. 11, 1902.
A. H. ANDREWS.
FIRE ESCAPE.
(Application filed Sept. 19, 1900.)
(No Model.) 4 Sheets—Sheet 1.
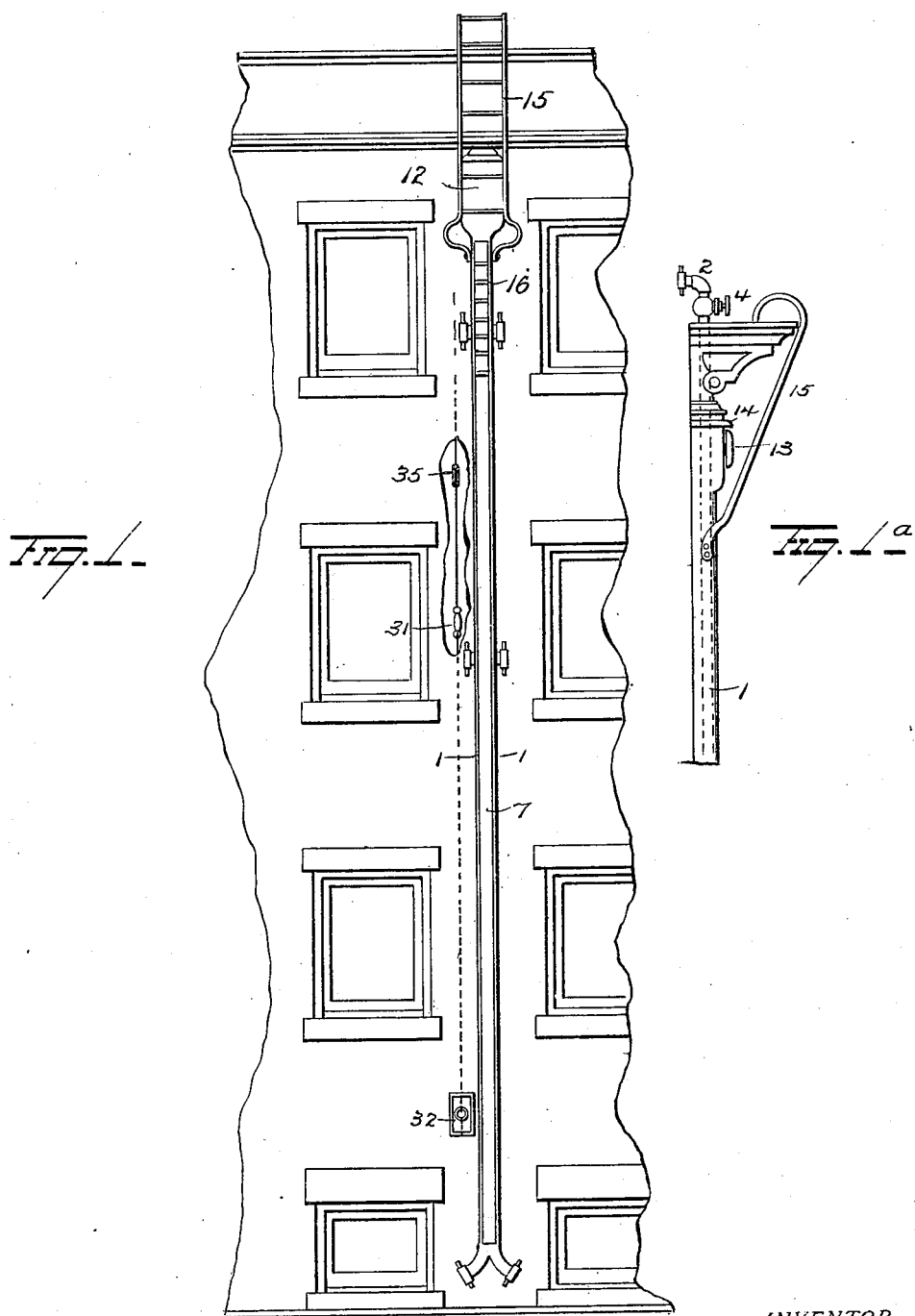

No. 693,095. Patented Feb. 11, 1902.
A. H. ANDREWS.
FIRE ESCAPE.
(Application filed Sept. 19, 1900.)
(No Model.) 4 Sheets—Sheet 2.
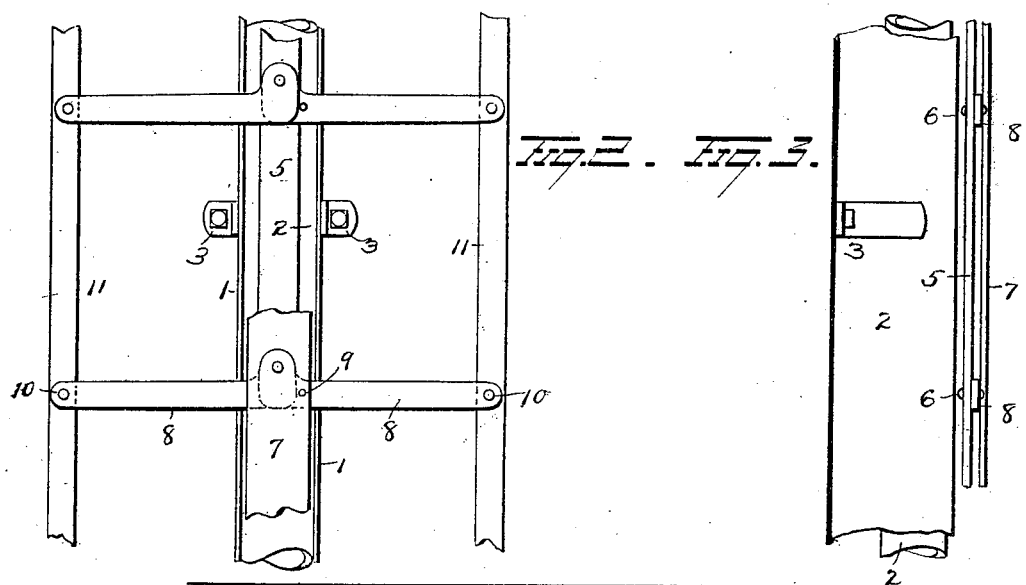
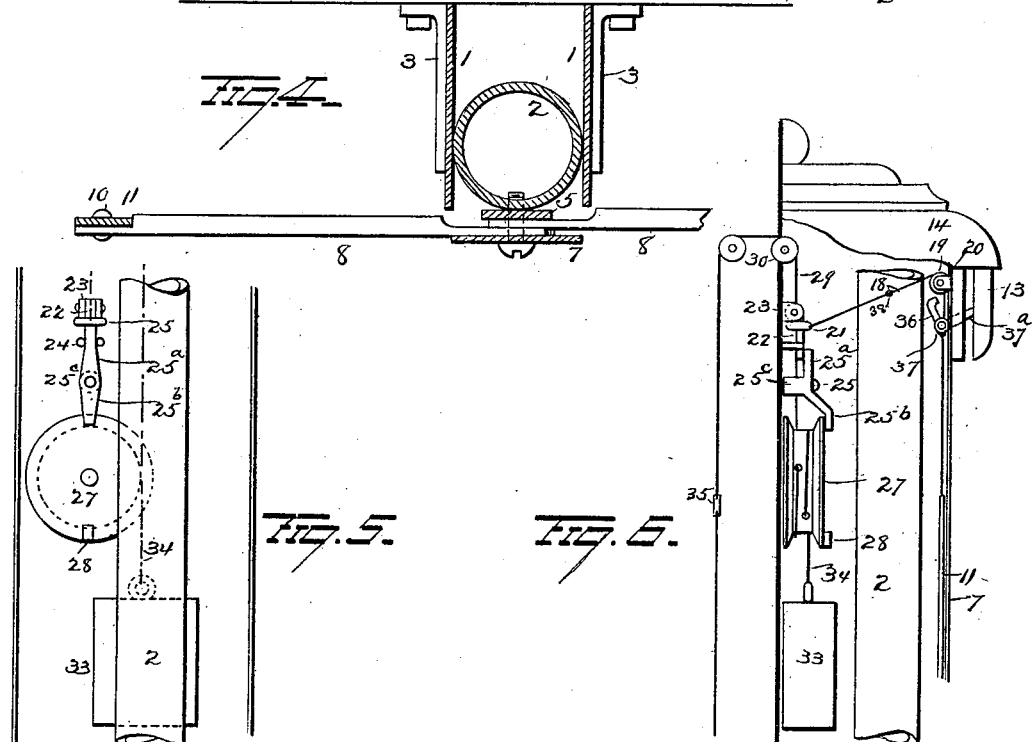
WITNESSES
E. J. Nottingham
G. F. Downing
INVENTOR
A. H. Andrews
By H. A. Seymour
Attorney
THE NORRIS PETERS CO., PHOTO-LITHO., WASHINGTON, D. C.

No. 693,095. Patented Feb. 11, 1902.
A. H. ANDREWS.
FIRE ESCAPE.
(Application filed Sept. 19, 1900.)

(No Model.) 4 Sheets—Sheet 3.

WITNESSES
E. D. Nottingham
G. F. Downing.

INVENTOR
A. H. Andrews
By H. A. Seymour
Attorney

No. 693,095. Patented Feb. 11, 1902.
A. H. ANDREWS.
FIRE ESCAPE.
(Application filed Sept. 19, 1900.)
(No Model.) 4 Sheets—Sheet 4.
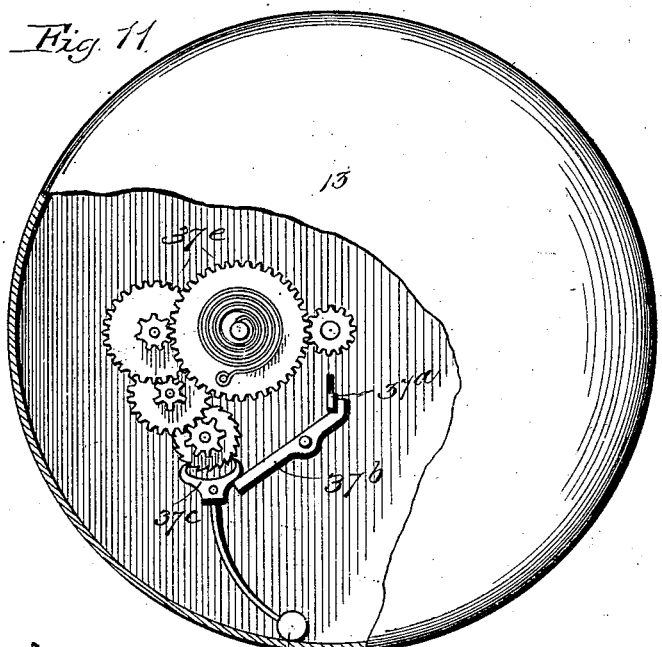
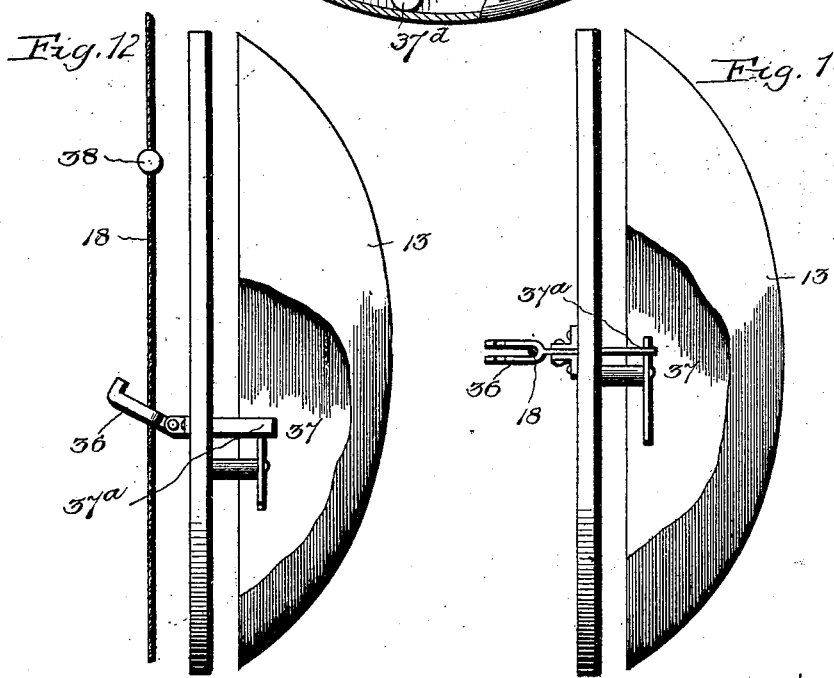
Witnesses:
J. L. Mockabee
G. F. Downing
Inventor:
A. H. Andrews
By H. A. Seymour
Attorney

UNITED STATES PATENT OFFICE.

ARTHUR H. ANDREWS, OF ELMIRA, NEW YORK.

FIRE-ESCAPE.

SPECIFICATION forming part of Letters Patent No. 693,095, dated February 11, 1902.

Application filed September 19, 1900. Serial No. 30,512. (No model.)

*To all whom it may concern:*

Be it known that I, ARTHUR H. ANDREWS, a resident of Elmira, in the county of Chemung and State of New York, have invented certain new and useful Improvements in Fire-Escape Systems; and I do hereby declare the following to be a full, clear, and exact description of the invention, such as will enable others skilled in the art to which it appertains to make and use the same.

My invention relates to an improved fire-escape system, the object of the invention being to provide a fire-escape which when not in use will occupy but a small space and be inclosed in a casing which will form an ornamental portion of the building of which it is a part.

A further object is to provide a fire-escape which, together with a stand-pipe, will be inclosed in and supported by a casing when not in use, but which when in position for use will have escaped from its inclosure and be in convenient position for egress from or ingress to the building.

A further object is to provide a fire-escape with an improved system of alarms automatically operated by the fire-escape when the latter falls into position for use.

A further object is to provide a fire-escape which when not in use will be inclosed in a casing, with improved automatic means for permitting the escape to fall into operative position when a fire is started in the building.

A further object is to provide an improved fire-escape which when not in use will be inclosed in a casing, but which can be operated from the street to permit the escape to fall into operative position and at the same time alarm the inmates.

With these objects in view the invention consists in certain novel features of construction and combinations and arrangements of parts, as will be more fully hereinafter described, and pointed out in the claims.

Figure 7:
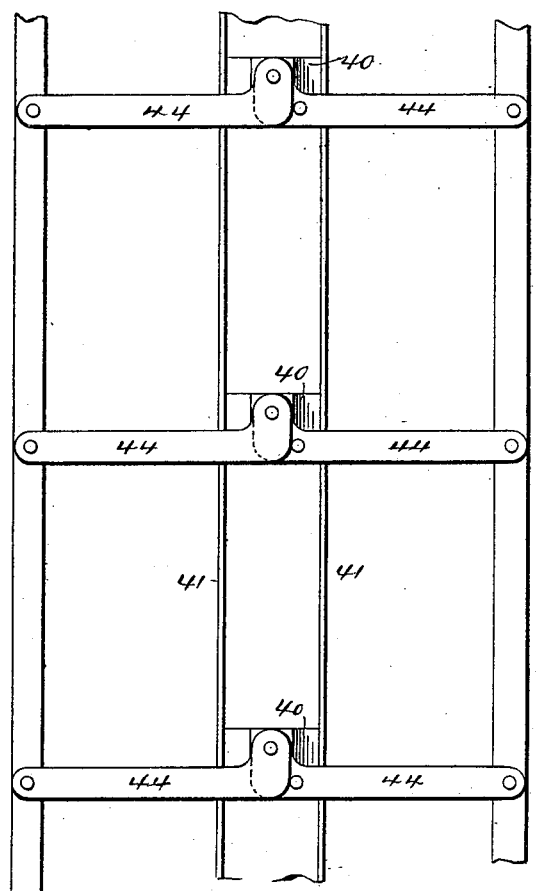
Figure 8:
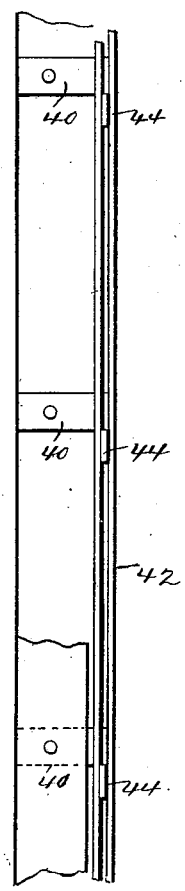
Figure 9:
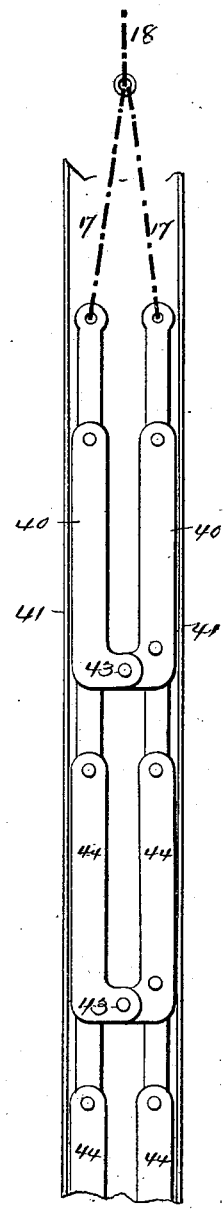
Figure 10:
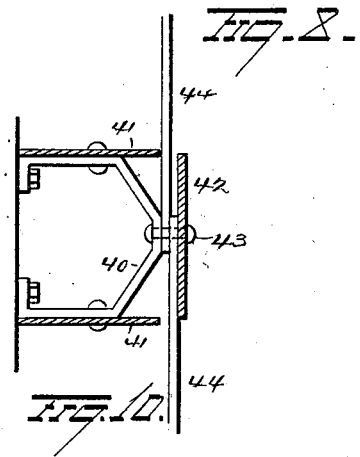

In the accompanying drawings, Figure 1 is a view illustrating my improvements. Fig. 1ª is a detailed view in side elevation. Fig. 2 is an enlarged front view, partly broken away, of a portion of the ladder ready for use. Fig. 3 is a side view of the same. Fig. 4 is a view in horizontal section of the same. Figs. 5 and 6 are enlarged detail views of the ladder-holding mechanism and alarm, and Figs. 7, 8, 9, and 10 are views of a modified form of my invention. Figs. 11, 12, and 13 are views illustrating the gong-operating mechanism.

1 1 represent parallel side plates spaced a suitable distance apart to receive between them a vertical stand-pipe 2 and secured to the building by means of anchor-plates 3, as shown. The stand-pipe 2 extends from a point near the ground, where it is preferably provided with couplings for the attachment of fire-hose, and projects above the roof of the building, where it is provided with a coupling and a valve 4 to regulate the flow of water, and is also provided at points throughout its length at the different floors of the building with couplings to permit the attachment of hose for use on the different floors.

To the outer face of the stand-pipe 2 a vertical bar 5 is secured by means of bolts or screws 6, which latter are passed through a vertical plate 7 and through alined holes in the upwardly-projecting inner ends of rung-sections 8, disposed between bar 5 and plate 7, and one of each pair of rung-sections provided with a pin or projection 9, adapted to be engaged by the inner end of the other rung-section to limit the downward pivotal movement thereof, hence holding the rungs horizontal when in their operative position. The free ends of the rung-sections are pivotally connected by pins or rivets 10 with side bars 11, which, together with the rungs, form a perfect ladder easy to ascend or descend.

The upper ends of side plates 1 1 and front plate 7 are enlarged to form a casing 12, supporting a gong 13 and motor for operating the same, which gong 13 is protected from the weather by a suitable hood 14, and a ladder 15 is secured at one end to the plate 7 and projects up over the roof of the building, and suitable footholds 16 are located on the plate 7 below the ladder to permit a person to step from one of the upper windows onto said footholds and ascend to the roof or to set the trip holding the ladder folded, as will be more fully hereinafter explained.

To the upper ends of the side bars 11 are secured short chains 17, both connected to a chain 18, which latter is passed over a pulley 19, supported in a bracket 20 on the inner face of plate 7, and provided on its end with a ring 21. The ring 21 when the ladder is in its folded or raised position is mounted on a small rod 22, pivotally supported at its upper end in a bracket 23, secured to the wall of the building, and said rod is held at its lower end between pins 24 to prevent accidental lateral movement of the rod 22 by one arm 25$^a$ of a trip 25, pivoted between its ends, where it is made with an elongated bearing 25$^c$ of sufficient length to dispose the arm 25$^a$ above the free end of rod 22 and hold the same in its downward position and the ring 21 thereon. The other arm 25$^b$ of the trip is bent outward and downward and is disposed beside a sheave 27 and in the path of a lug 28 thereon, which latter is adapted to strike the arm 25$^b$ when the sheave is rotated and force the arm 25$^b$ to one side, thus forcing arm 25$^a$ out of the path of rod 22 and permit the weight of the ladder to pull the rod 22 upward to release the ring 21 therefrom and allow the ladder to fall into operative position.

A chain or cable 29 is secured at one end to the sheave 27, wound around the same, and then passed over a pulley 30 and into the building and thence down through the several floors thereof, where it is provided with handholds 31 in easy reach of a person on the different floors and is also provided with a pull inclosed in a casing having a glass door 32 on the outside wall of the building in convenient reach of a fireman or other person on the street, whereby the fire-escape can be operated in case the building is unoccupied or the inmates are unaware of the fire. The lower end of the chain or cable 29 is secured in any approved manner so as to hold the same taut and prevent accidental turning of the sheave, and a weight 33 is suspended from the sheave 27 by a chain or cable 34, wound around the sheave in the opposite direction to the chain or cable 29, and the latter is provided throughout its length with fusible links 35, adapted to be broken by the heat of a fire, when the weight 33 will revolve sheave 27, force lug 28 against trip 25, and release the ladder, as above explained.

The chain 18 before it passes over the pulley 19 is passed through the slotted or bifurcated member 36 of a bell-crank trip 37, the other member 37$^a$ of which engages one end of a lever 37$^b$, and the other end of said lever bears against the escapement-pallet 37$^c$ of the gong-motor 37$^e$, and the hammer 37$^d$ of the gong is carried by said pallet. Thus when the member 37$^a$ of the trip-lever 37 is raised by the depression of the member 36 the lever 37$^b$ will be released from the pallet and the latter permitted to operate to sound the gong. The bifurcated or slotted member 36 is made hook-shaped at its free end, and the chain or cable 18 is provided near its end with a ball or enlargement 38, which when the ladder is released and pulls chain 18 downward will pull member 36 downward and raise the member 37$^a$ and release the motor to sound the alarm, thus notifying the inmates of the fire and those on the street of the danger of the inmates.

Suitable gongs may be provided at the different floors of the building and operated automatically by the falling of the ladder into operative position.

The upper portion of plate 7, which incloses sheave 27, is preferably hinged, so as to permit a person to climb up the footholds 16 and set the ladder and trip 25 and also rewind the motor for operating gong 13.

It will thus be seen that when the ladder is not desired it is entirely hid behind plate 7, which latter may, together with side plates 1 1, be ornamented to conform to the ornamentation of the building and form an attractive part thereof; but when the ladder is released by any of the means above described it will fall of its own weight into operative position and form a safe and easy way to escape from the building and will also be of great assistance to the firemen in fighting the fire, as they are not only afforded an easy ingress to the building, but the stand-pipe will supply the water to all of the floors and the roof of the building. It will also be seen that the ladder can be operated from the outside of the building, but that as the alarm is sounded simultaneously with the unfolding of the ladder a burglar cannot make use of the ladder for ingress to the building.

The operation of my improvement is as follows: When the ladder is not in use, it is folded up behind the plate 7; but in case of fire a person inside or outside the building pulls the chain or cable 29 downward, which operation will revolve sheave 27 until the lug 28 thereon strikes the trip 25 and releases rod 22, when the weight of the side bars of the ladder will pull the rod 22 to a position to release ring 21 and allow the side bars to fall outward and downward until the rungs are in a horizontal position. The ball or enlargement 38 on chain 18 strikes trip 37 simultaneously with the fall of the ladder and releases the motor to sound the gong. The motor is preferably a spring-motor, which may be wound up when run down; but it might be an electric motor, if desired. If there is no one aware of the fire, the heat thereof will destroy one of the fusible links 35, and the weight 33 will release the ladder, as heretofore explained.

Instead of constructing my improvements as above described I might make the same as shown in Figs. 7, 8, 9, and 10. In this form of my invention the stand-pipe is dispensed with, and a series of angular brackets 40 are secured at intervals throughout the height of the building, and side plates 41 are secured to the sides of the brackets, and a front plate 42 is secured to the front of the brackets 40 by means of bolts or screws 43, on which are pivoted the inner ends of the rung-sections 44 of the ladder, which rung-sections are disposed between the bracket and plate 42, behind which latter they are hid when in their inoperative or folded position, a suitable space being left between the outer edge of side plates 41 and front plate 42 for the raising and lowering of the side bars and rungs of the ladder.

Various other slight changes might be resorted to in the general form and arrangement of the several parts described without departing from the spirit and scope of my invention, and hence I would have it understood that I do not wish to be limited to the precise details set forth, but consider myself at liberty to make such slight changes and alterations as fairly fall within the spirit and scope of my invention.

Having fully described my invention, what I claim as new, and desire to secure by Letters Patent, is—

1. In a fire-escape, the combination with a stand-pipe and a casing inclosing the same, said stand-pipe constituting a support for the front of the casing, of a folding ladder normally folded and inclosed in the casing, means for holding the ladder folded and inclosed in the casing and means for releasing said holding means.

2. In a fire-escape, the combination of a ladder comprising a rigid support, side bars, rungs pivotally connected at their ends to the side bars and hinged together between their ends and pivoted to said rigid support at their central hinged point, means for holding the side bars elevated and means for releasing said holding means.

3. In a fire-escape, the combination of a casing comprising parallel side plates, a front plate spaced therefrom, a ladder comprising side bars, rungs pivotally connected at their ends to the side bars, hinged at their center and pivotally connected to the inner face of the front plate, means adapted to hold the side bars and rungs folded behind the front plate and means for releasing the ladder and permitting the side bars and rungs to fall into operative position.

4. In a fire-escape, the combination with a rigid support, of a ladder having its rungs hinged centrally and connected at the hinged center of the rungs to the rigid support, a flexible device connected to the upper ends of the side bars of the ladder, means for securing the flexible device in its highest position and hence holding the side bars raised and close together, and means adapted to be operated from one of a number of points for releasing the flexible device.

5. In a fire-escape, the combination of a folding ladder, a trip adapted to hold the ladder folded, a sheave having means thereon for releasing the trip to permit the ladder to unfold, a flexible device secured to the sheave, wound around the same and passed through the building to which the fire-escape is connected, a counterweight and a flexible device connecting the weight and sheave and wound around the latter in the opposite direction to the first-mentioned flexible device for retaining the trip-releasing means in normal position, so that when the first-mentioned flexible device is given a pull, the sheave will be rotated against the resistance of the weight and caused to release the ladder-holding trip.

6. In a fire-escape, the combination of a folding ladder adapted to be connected to a building, a trip adapted to hold the ladder folded, a sheave having means thereon for operating the trip to release the ladder and permit it to unfold, a flexible connection connected to the sheave, wound around the same and held taut, a flexible device wound on the sheave in the opposite direction, a weight attached to said flexible device, and fusible links on the first-mentioned flexible connection adapted to be destroyed by the heat of a fire to permit the weight to revolve the sheave and release the trip from the ladder.

7. In a fire-escape, the combination with a folding ladder, a chain secured to the ladder, a trip adapted to hold the chain in position to maintain the ladder folded, of a gong, a trip for the gong, and means on the chain for operating the last-mentioned trip to sound the gong.

8. In a fire-escape, the combination with a folding ladder, a chain adapted to be elevated and hold the ladder in its folded position and a ring on the free end of the chain, of a pivoted rod on which the ring is disposed, a trip adapted to hold the rod in position to maintain the ring thereon and means for operating the trip to release the rod and permit the ring to be freed therefrom by the weight of the ladder unfolding itself.

In testimony whereof I have signed this specification in the presence of two subscribing witnesses.

ARTHUR H. ANDREWS.

Witnesses:
M. A. NAGLE,
W. P. CHASE.